United States Patent
Torfs et al.

(10) Patent No.: US 10,567,083 B2
(45) Date of Patent: Feb. 18, 2020

(54) SIGMA-DELTA MODULATED RF OVER FIBER AND FILTERING

(71) Applicants: Universiteit Gent, Ghent (BE); IMEC vzw, Leuven (BE)

(72) Inventors: Guy Torfs, De Pinte (BE); Johan Bauwelinck, Temse (BE); Haolin Li, Wondelgem (BE); Laurens Breyne, Ypres (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 0 days.

(21) Appl. No.: 15/907,534

(22) Filed: Feb. 28, 2018

(65) Prior Publication Data

US 2018/0254829 A1    Sep. 6, 2018

(30) Foreign Application Priority Data

Mar. 3, 2017   (EP) .................................... 17159061

(51) Int. Cl.
    *H04B 10/2575*   (2013.01)
    *H04B 10/50*     (2013.01)
    *H04B 10/516*    (2013.01)

(52) U.S. Cl.
    CPC ..... *H04B 10/25753* (2013.01); *H04B 10/503* (2013.01); *H04B 10/5161* (2013.01); *H04B 2210/006* (2013.01)

(58) Field of Classification Search
    None
    See application file for complete search history.

(56) References Cited

U.S. PATENT DOCUMENTS

| 5,347,389 | A  | * | 9/1994  | Skrobko    | ................... | H03F 1/22 250/214 A |
| 6,326,600 | B1 | * | 12/2001 | Christensen | ............ | G02B 6/43 250/201.1 |

(Continued)

FOREIGN PATENT DOCUMENTS

| EP | 2180611 A1 | * | 4/2010  | ........... H03F 3/2175 |
| EP | 2180611 A1 | * | 4/2010  | ........... H03F 3/2175 |
| JP | 2002325109 A |   | 11/2002 | |

OTHER PUBLICATIONS

Extended European Search Report from EP Application No. EP 17 15 9061, dated Aug. 30, 2017.

*Primary Examiner* — David W Lambert
(74) *Attorney, Agent, or Firm* — Workman Nydegger

(57) ABSTRACT

A communication system is provided for transmitting a RF signal, which has a frequency band. The communication system comprises: a sigma delta modulator for modulating the RF signal into a broadband signal wherein the signal to noise ratio of the broadband signal is higher in the frequency band of the RF signal than outside the frequency band of the RF signal; an optical transmitter connected with the sigma delta modulator and with an optical fiber for transmitting the broadband signal over the optical fiber; a photo-detector configured for receiving the broadband signal from the optical fiber and converting it into an electrical signal; an output device and a matching circuit configured for power matching and/or noise matching of the photo-detector, at the frequency band of the RF signal, with the output device.

10 Claims, 5 Drawing Sheets

(56) References Cited

U.S. PATENT DOCUMENTS

| | | | | |
|---|---|---|---|---|
| 7,443,324 B1 | * | 10/2008 | Muhammad | H03M 3/332 |
| | | | | 341/131 |
| 2004/0252038 A1 | * | 12/2004 | Robinson | H03M 3/50 |
| | | | | 341/143 |
| 2005/0083220 A1 | * | 4/2005 | Siferd | H03M 3/344 |
| | | | | 341/143 |
| 2007/0013441 A1 | * | 1/2007 | Lee | H03F 3/217 |
| | | | | 330/10 |
| 2011/0285565 A1 | * | 11/2011 | Hossain | H03M 7/302 |
| | | | | 341/143 |

* cited by examiner

SIGMA-DELTA MODULATED RF OVER FIBER AND FILTERING

FIELD OF THE INVENTION

The invention relates to the field of communication systems. More specifically it relates to a communication system and a method for transmitting a band limited RF signal over an optical fiber.

BACKGROUND OF THE INVENTION

Mobile networks or wireless systems of the 5$^{th}$ generation, also referred to as 5G, aim to achieve a higher capacity than 4G. In a 5G radio context, the number of antennas is expected to increase dramatically. To reduce energy and allow sharing of resources, a centralized basestation architecture is most advantageous. Furthermore, different 5G techniques under study, such as Massive multiple input multiple output (MIMO), require synchronization between different antennas, which further increase the need for centralized processing and RF generation. However, the distribution of the RF signals from the centralized basestation toward the antennas is not trivial. Because with increasing distance and frequency, copper loss will degrade performance.

RF signals may be transported over fiber by digital encapsulation of I/Q samples of the RF signal using for example the Common Public Radio Interface (CPRI). The disadvantage of this solution is that significant processing is required at the antenna side. Furthermore, synchronization of different antennas is difficult, which complicates Massive MIMO scenarios.

Another option for transporting RF signals over fiber is direct modulation of the optical carrier with an analog signal. This can be done at the required RF frequency or at a lower IF frequency. If modulated at the RF frequency, only optical to electrical conversion is required at the remote antenna and the optical channel can be incorporated in the overall channel the system encounters, hence similar equalization techniques already used in wireless systems can be reused to remove fiber imperfections. If a lower IF frequency is used, an upconversion stage is still required at the remote antenna. The latter will again increase the difficulty of antenna synchronization.

However, to modulate the wireless signals on an optical carrier, modulators with a high dynamic range are required. They should add only little noise and should be sufficiently linear to ensure the wireless signal is not distorted. Typically, Mach Zehnder modulators or direct modulation of DFB lasers are employed. Both are expensive photonic devices.

There is therefore a need for systems and methods to transport RF signals from a centralized basestation over optical fiber towards the antennas.

SUMMARY OF THE INVENTION

It is an object of embodiments of the present invention to provide a good method and system for transmitting an RF signal over an optical fiber.

The above objective is accomplished by a method and device according to the present invention.

In a first aspect embodiments of the present invention relate to a communication system for transmitting a RF signal which has a frequency band. The communication system comprises a sigma delta modulator for modulating the RF signal into a broadband signal wherein the signal to noise ratio of the broadband signal is higher in the frequency band of the RF signal than outside the frequency band of the RF signal.

The communication system moreover comprises an optical transmitter connected with the sigma delta modulator and with an optical fiber for transmitting the broadband signal over the optical fiber.

The communication system moreover comprises a photodetector configured for receiving the broadband signal from the optical fiber and converting it into an electrical signal.

The communication system moreover comprises an output device and a matching circuit configured for power matching and/or noise matching of the photo-detector, at the frequency band of the RF signal, with the output device.

It is an advantage of embodiments of the present invention that, because of the sigma delta modulation, the spectrum of the broadband signal has a higher signal-to-noise ratio in the narrow frequency band of the RF signal than outside the narrow frequency band of the RF signal. This narrow frequency band of the RF signal within the broadband signal is also referred to as the frequency band of interest. Thereby the quantisation noise is out-of-band with the frequency band of interest. It is an advantage of embodiments of the present invention that, by power matching and/or noise matching of the photo-detector at the frequency band of interest of the RF signal with the output device, the out-of-band quantisation noise generated by the sigma delta modulator can be filtered out. It is an advantage of embodiments of the present invention that because of the narrowband matching the noise is reduced while the RF signal remains.

It is an advantage of embodiments of the present invention that the sigma delta modulator is suitable for modulating the RF signal into a broadband signal wherein the signal to noise ratio of the broadband signal is higher in the frequency band of the RF signal than outside the frequency band of the RF signal. The bandwidth of the power matching and/or of the noise matching is similar to the bandwidth of the RF signal. It should be sufficiently broad for receiving the RF signal, while limited enough to ensure noise suppression. In embodiments of the present invention the bandwidth of the power matching and/or of the noise matching is the same as the bandwidth of the RF signal. In embodiments of the present invention it is between 0% and 5% larger or even between 0% and 10% larger.

It is an advantage of embodiments of the present invention that the sigma delta modulator quantizes the RF signal into a limited number of levels. The quantisation allows to use a non-linear optical transmitter to transmit the broadband signal. This may result in optical transmitters with a lower cost and a lower power consumption than their linear counterparts. The sigma delta modulator may be configured for modulating the RF signal into a 2-level (a binary 1 and 0) broadband signal. A 2-level signal is inherently linear. Alternatively, a higher signal-to-noise ratio can be obtained using multi-level sigma-delta modulation at the cost of linearity.

It is an advantage of embodiments of the present invention that, by power matching and/or noise matching the photo-detector at the frequency band of interest of the broadband signal with the output device, the amount of power which can be extracted from out of the optical signal can be increased.

It is an advantage of the oversampling that beamforming techniques can be implemented because a fine resolution time delay can be realised.

In embodiments of the present invention the optical transmitter is a vertical-cavity surface-emitting laser.

It is an advantage of embodiments of the present invention that VCSELs can be used as optical transmitter. This is possible because of the quantisation of the RF signal. As a consequence thereof it is not required to have a linear optical transmitter.

In embodiments of the present invention the output device comprises an antenna for transmitting the electrical signal.

In embodiments of the present invention the output device moreover comprises an amplifier connected between the matching circuit and the antenna for amplifying the electrical signal before it is transmitted by the antenna wherein the matching circuit is configured for matching the photodetector with the amplifier.

In embodiments of the present invention a narrowband transimpedance amplifier is realised by the matching circuit and the amplifier. In embodiments of the present invention the amplifier is a low noise amplifier. It is an advantage of embodiments of the present invention that the electrical signal is amplified before it is transmitted by the antenna. Thereby the range of the communication system can be increased.

In embodiments of the present invention the sigma delta modulator is a bandpass modulator.

In embodiments of the present invention the sigma delta modulator is a baseband modulator followed by a digital upconvertor.

In embodiments of the present invention the output device comprises a mixer. It is an advantage of embodiments of the present invention that this allows low IF transmission. This may be any frequency lower than the RF frequency. A useful range may for example be the lower GHz range (e.g. 1-3 GHz) and performing upconversion to mm wave frequencies (e.g. to 28 GHz or above, or even to 60 GHz or above, or even higher) at the antenna. At lower frequencies the available power at the photodiode is higher, hence, more signal will be available after the optical link.

In a second aspect embodiments of the present invention relate to a mobile network. The mobile network comprises at least one basestation, a plurality of antennas, and a plurality of communication systems according to embodiments of the present invention. The communication systems are connected between the basestations and the antennas for transmitting RF signals between the basestations and the RF antennas.

In embodiments of the present invention the RF signals are transmitted from the basestations to the RF antennas. It is an advantage of embodiments of the present invention that it is possible that RF signals can be distributed from a centralized base station towards different antennas. Such a configuration with centralised base station can for example be applied in a 5G radio application. It is an advantage of embodiments of the present invention that the transmission between the centralised basestation and the antennas can be done over an optical link. If copper would be used for transmitting the RF signal, copper loss will degrade the performance when the distance and frequency is increasing.

In a third aspect embodiments of the present invention relate to a method for transmitting a RF signal which has a frequency band. The method comprises: a modulation step wherein the RF signal is oversampled and sigma delta modulated into a broadband signal wherein the signal to noise ratio of the broadband signal is higher in the frequency band of the RF signal than outside the frequency band of the RF signal; an electro-optical conversion step wherein the broadband signal is converted into an optical signal and transmitted over an optical link; an opto-electrical conversion step wherein the broadband signal is received from the optical link and converted into an electrical signal; a matching step for power matching and/or noise matching the electrical signal, at the frequency band of the RF signal, with an output device.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
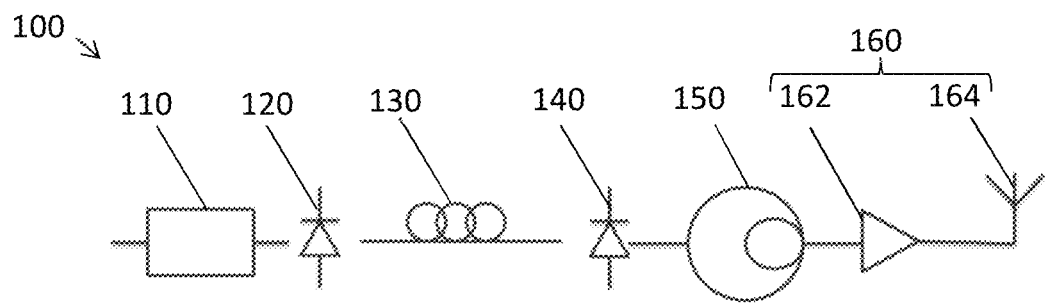
FIG. 1 schematically shows a communication system in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a band limited RF signal, reference is made to an RF signal which in the frequency domain has a frequency band with a limited bandwidth. In embodiments of the present invention the bandwidth of the RF signal may for example be 10% or less of the RF carrier frequency.

Where in embodiments of the present invention reference is made to power matching of the photo-detector with the output device, reference is made to matching of the photo-detector with the output device such that the overall gain of the photo-detector/output device is maximized.

Where in embodiments of the present invention reference is made to noise matching of the photo-detector with the output device, reference is made to matching of the photo-detector with the output device such that the overall noise factor of the photo-detector/output device is minimized.

Where in embodiments of the present invention reference is made to power matching and noise matching of the photo-detector with the output device, a matching tradeoff is made to realize a power gain less than the maximum and to realize a noise level higher than the minimum but less than the noise obtained when power matching only.

In a first aspect embodiments of the present invention relate to a communication system 100 for transmitting a band limited radio frequency (RF) signal. The communication system comprises a sigma delta modulator 110, an optical transmitter 120, an optical fiber 130, a photo-detector 140, an output device 160, and a matching circuit 150. An exemplary embodiment of such a communication system 100 in accordance with embodiments of the present invention is schematically illustrated in FIG. 1.

The sigma delta modulator 110 is configured for modulating the RF signal into a broadband signal wherein the signal to noise ratio of the broadband signal is higher in the frequency band of the RF signal than outside the frequency band of the RF signal. In embodiments of the present invention the sigma delta modulator 110 oversamples and quantizes a waveform in such a way that the original spectrum is maintained and that the noise resulting from the quantization operation is shaped in such a way that it is out of the frequency band of interest given the noise transfer function properties of the sigma delta modulator (SDM). Thus a narrowband spectrum of interest is created with a high signal to noise ratio and with outside the narrowband spectrum the noise such as quantization noise. The sigma delta modulator oversamples the signal and quantizes it to a limited number of levels (e.g. 2, which are a binary 1 and 0).

The employed quantization can be as low as 1 bit. As a result, non-linearity of the driving circuit will no longer influence the signal. Hence it is possible to use non-linear optical components such as vertical-cavity surface-emitting laser (VCSELs). It is an advantage of embodiments of the present invention that non-linear VCSELs can be used to modulate an analog waveform on an optical carrier.

The optical transmitter 120 is at its input side connected with the sigma delta modulator 110 and at its output side with the optical fiber for transmitting the broadband signal over the optical fiber 130.

When looking to the transmitted frequency spectrum, the wanted signal will be transmitted without any distortion, however, next to the signal, at lower and higher frequencies, a significant amount of quantization noise will be present. The obtainable bandwidth for RF transmission is determined by the used oversampling factor, the number of quantization levels and the order of the noise transfer function.

The photo-detector 140 is configured for receiving the broadband signal from the optical fiber 130 and for converting it into an electrical signal.

The matching circuit 150 is connected with its input to the photo-detector 140 and with its output to the output device

160. The matching circuit 150 is configured for power matching and/or noise matching of the photo-detector 140 at the frequency band of the RF signal with the output device 160.

In embodiments of the present invention the sigma delta modulator 110 will create out of band-noise. It is an advantage of embodiments of the present invention that this out of band-noise is removed at the receiver side by power matching and/or noise matching of the photo-detector 140, at the frequency band of the RF signal, with the output device 160 using the matching circuit 150.

In embodiments of the present invention the driving signal (the output signal of the sigma delta modulator) is a serial digital stream. The digitalization is advantageous for implementing upconversion. The oversampling allows to implement beamforming techniques as a fine resolution time delay can be implemented. Because of the digitalization an all-digital implementation of the transmitter architecture is possible. An all-digital architecture removes the need for a DAC modulator/frequency synthesizer. This allows to reduce the power of the transmitter architecture. It is for example possible to reduce the power with more than 100 mW, or even up to 1 W or higher per transmitter.

In embodiments of the present invention at the receive side, a photodiode 140 is used to extract the RF signal out of the optical domain and convert it to an electrical power, which after optional amplification can be transmitted using an antenna. Photodiodes are much more linear than VCSELs and won't (or only marginally) decrease the performance of the link.

In embodiments of the present invention the photodetector 140 and matching circuit 150 may be implemented as a photodiode matched at the frequency of interest to a low noise amplifier 162 or directly to an antenna 164.

Because of the power matching and/or noise matching with the output device, the power loss can for example be reduced by an amount of 20 dB or even of 40 dB. It is therefore an advantage of embodiments of the present invention that less power is required from the optical transmitter. Moreover, it is an advantage of the sigma delta modulation in combination with the power matching and/or noise matching that the noise outside the spectrum of the signal of interest is filtered out.

In embodiments of the present invention the sigma delta modulator 110 may be implemented as a bandpass modulator, or as a baseband modulator followed by a digital upconversion, i.e. multiplying the resulting baseband signal with a squarewave. This will result in additional spectral components, which will again be filtered out at the receive side. To make the implementation of the SDM easier, the oversampling of the signal at the input can be limited to zero insertion instead of interpolation. Again this will give rise to additional spectral impurities which should be filtered out at the receive side.

Realtime generation of the sigma-delta modulated signal at very high sampling rates (e.g. >=10 Gbps) may be implemented using parallelization. In embodiments of the present invention parallelization factors of 16 or even more may be implemented.

Figure 2:
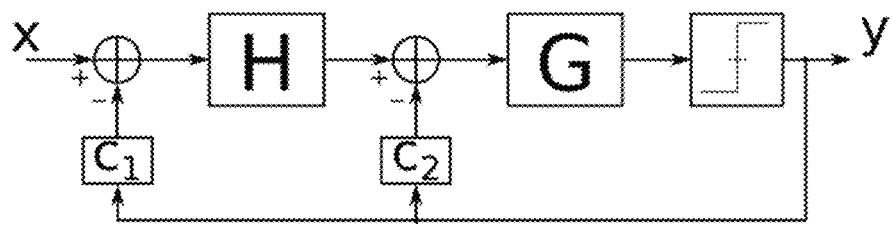
FIG. 2 shows a possible implementation of a $4^{th}$ order band-pass sigma-delta modulator which can be used as sigma delta modulator in accordance with embodiments of the present invention.

FIG. 2 shows a possible implementation of a $4^{th}$ order band-pass sigma-delta modulator (BPSDM) which can be used as sigma delta modulator 110. In this example the first transfer function H can be expressed as:

$$H = \frac{1 - Az^{-1}}{1 - 2Az^{-1} + z^{-2}}$$

In this example the second transfer function G can be expressed as:

$$G = \frac{(A - z^{-1})z^{-1}}{1 - 2Az^{-1} + z^{-2}}$$

wherein:

$$A = \cos\left(2\pi \frac{F_{center}}{F_{sample}}\right)$$

The feedback coupling factors c1 and c2 can for example be equal to:

$$c_1 = 2.5$$

$$c_2 = 3.5$$

Figure 3:
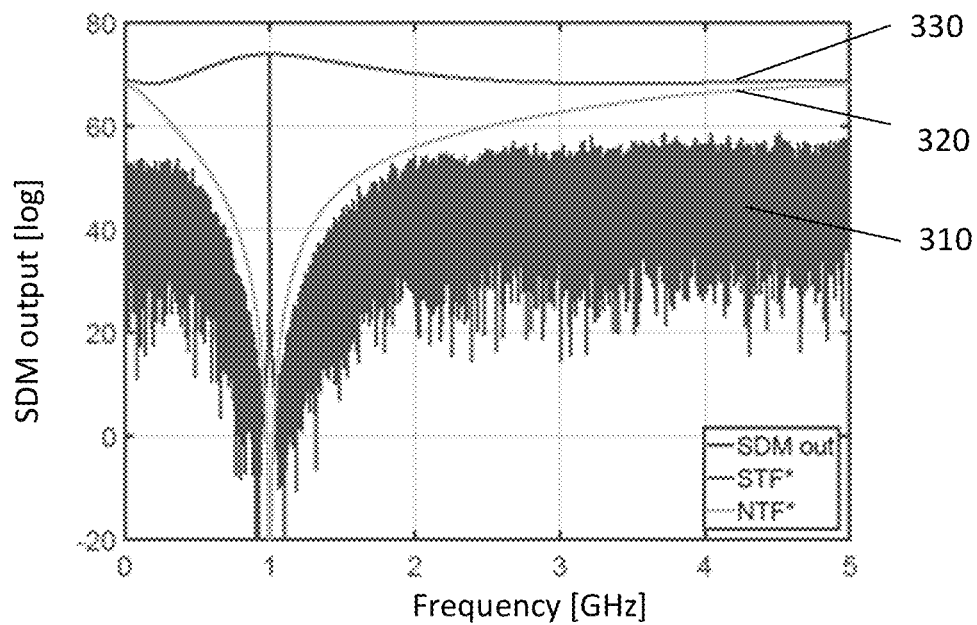
FIG. 3 shows the spectrum of an output signal of the sigma-delta modulator illustrated in FIG. 2.

A spectrum of an output signal of such a sigma delta modulator 110 is shown in FIG. 3. The spectrum of the output signal is shown by curve 310. It shows the output power, on a logarithmic scale, in function of the frequency. Around 1 GHz the signal to noise ratio of the broadband signal is higher than outside this region. This can also be seen from the noise transfer function (NTF) 320 and the signal transfer function (STF) 330 of the sigma delta modulator 110. The signal to noise ratio of the broadband signal, illustrated in FIG. 3, is higher in the frequency band of the RF signal than outside the frequency band of the RF signal. When for example using a 100 Gbps sampling speed $4^{th}$ order sigma delta modulator, a SNR of 60 dB may be obtained over 200 MHz (=20%) and an SNR of 40 dB may be obtained over 500 MHz (=50%).

Figure 4:
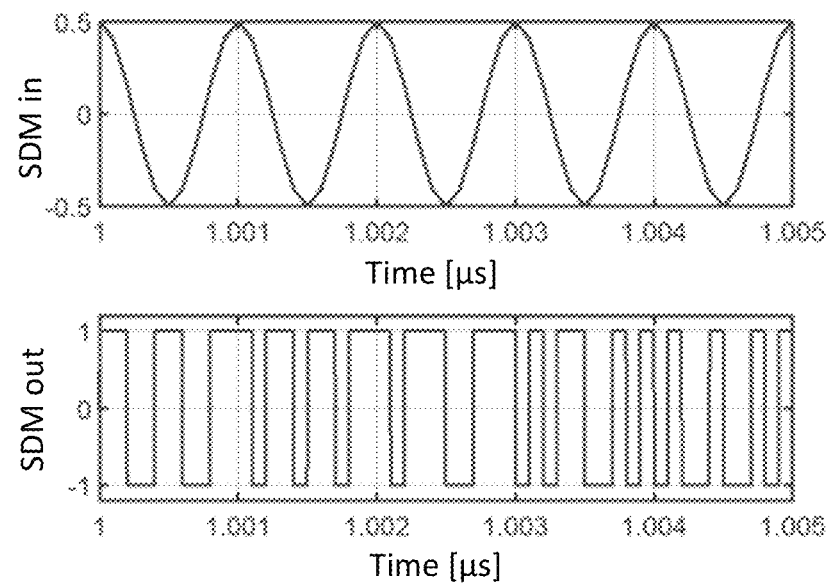
FIG. 4 shows a possible input signal and the corresponding output signal of a sigma delta modulator in accordance with embodiments of the present invention.

FIG. 4 shows a possible input signal and the corresponding output signal of a sigma delta modulator in accordance with embodiments of the present invention. The signals are shown in the time domain. The top graph shows a 1 GHz input signal and the bottom graph shows the corresponding output signal of the sigma delta modulator.

Figure 5:
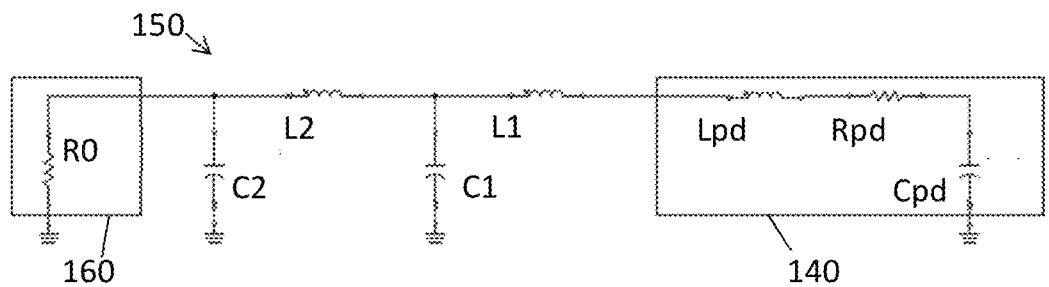
FIG. 5 shows an electric scheme of an exemplary embodiment of a matching circuit.

FIG. 5 shows an electric scheme (lumped component representation) of an exemplary embodiment of a matching circuit 150 (represented by the components L1, C1, L2, C2). In this example the matching circuit is a $4^{th}$ order pseudo-Chebyshev matching network between the photodiode 140 and the output device 160. For this example the output device is an antenna at 3.5 GHz (R0=50Ω). In this example the photodiode is represented by discrete components (Lpd, Rpd, Cpd) which are placed in series. These components may for example have the following values (Lpd=4 nH, Rpd=8Ω, Cpd=470 fF).

Figure 6:
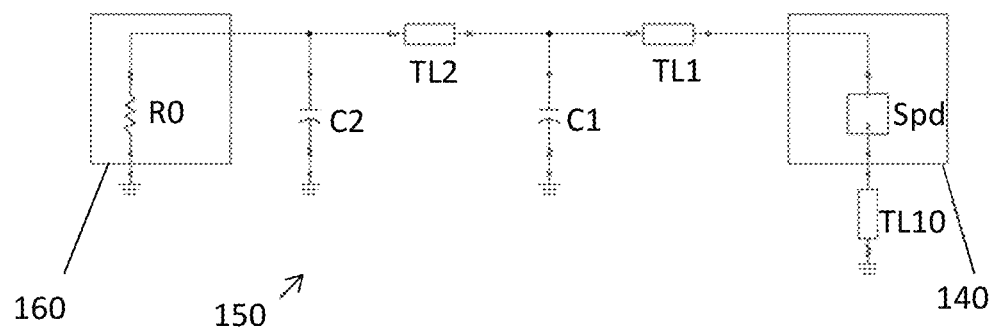
FIG. 6 also shows an electric scheme of an exemplary embodiment of a matching circuit.

FIG. 6 shows an electric scheme of an exemplary embodiment of a matching circuit in accordance with embodiments of the present invention. In this example the matching circuit is implemented using microstrip transmission lines and capacitors (represented by the components TL1, C1, TL2, C2). The photodiode 140 is represented by Spd, and the transmission line TL10 is a parasitic interconnection for connecting the photodiode with the ground.

Figure 7:
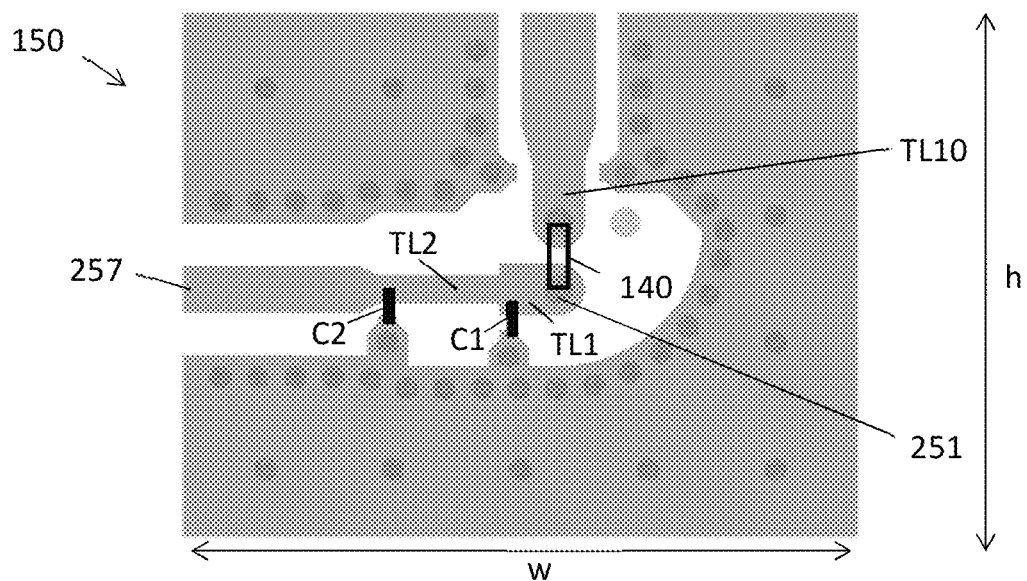
FIG. 7 shows a possible implementation, using microstrips, of the matching circuit illustrated in FIG. 6 in accordance with embodiments of the present invention.

An illustration of the microstrip layout is shown in FIG. 7. The photodiode 140 (in this drawing schematically represented by a rectangle) can be connected between the input 251 of the matching circuit 150 and the parasitic interconnection TL10. The output 257 of the matching circuit 150 can be connected to the output device 160. The two transmission lines TL1 and TL2 are present between the input 251 and the output 257 of the matching circuit 150. The capacitor C1 is connected on one side with the interconnection between TL1 and TL2 and on the other side with the ground. The capacitor C2 is connected between the opposite side of TL2 and the ground. In this example the microstrip layout has a size (h×w) of 14 mm×18 mm.

Figure 8:
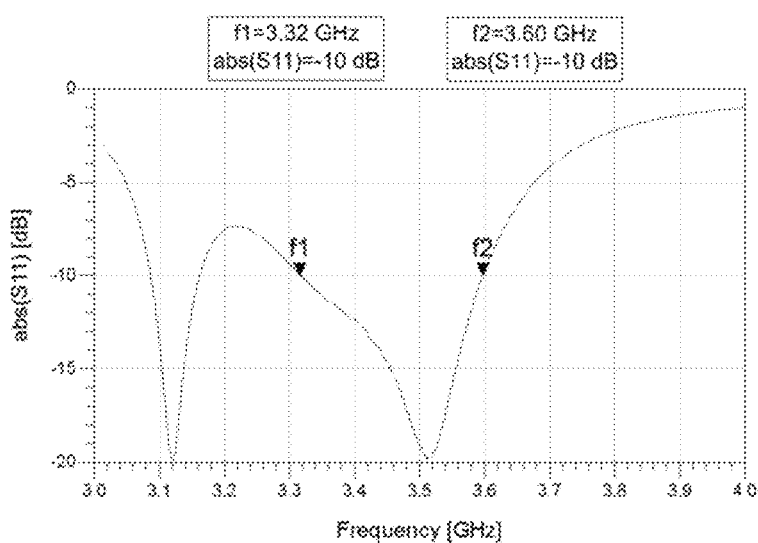
FIG. 8 shows the input port voltage reflection coefficient S11 in function of frequency of the $3^{rd}$ order Chebyshev matching network as illustrated in FIG. 7.

FIG. 8 shows the input port voltage reflection coefficient S11 in function of frequency of the 4$^{th}$ order pseudo-Chebyshev matching network as illustrated above. It has a central frequency of 3.5 GHz and a −10 dB bandwidth of about 0.28 GHz.

In embodiments of the present invention, the sigma delta modulator may be implemented as a parallelized multi-stage noise shaping (MASH) sigma delta modulator. It is an advantage of embodiments of the present invention that this allows to operate the signal generation at a lower speed, which can be serialized before transmission.

In embodiments of the present invention, the parallelized multi-stage noise shaping (MASH) sigma delta modulator can be of higher order, followed by a bit reduction process. The sigma delta modulator may for example be implemented as a second order parallel MASH modulator with bit-reduction. It is an advantage of embodiments of the present invention that this allows to reduce the output stream to a single bit stream which is inherently linear. As such it will not be impaired by optical modulator non-linearities.

Figure 9:
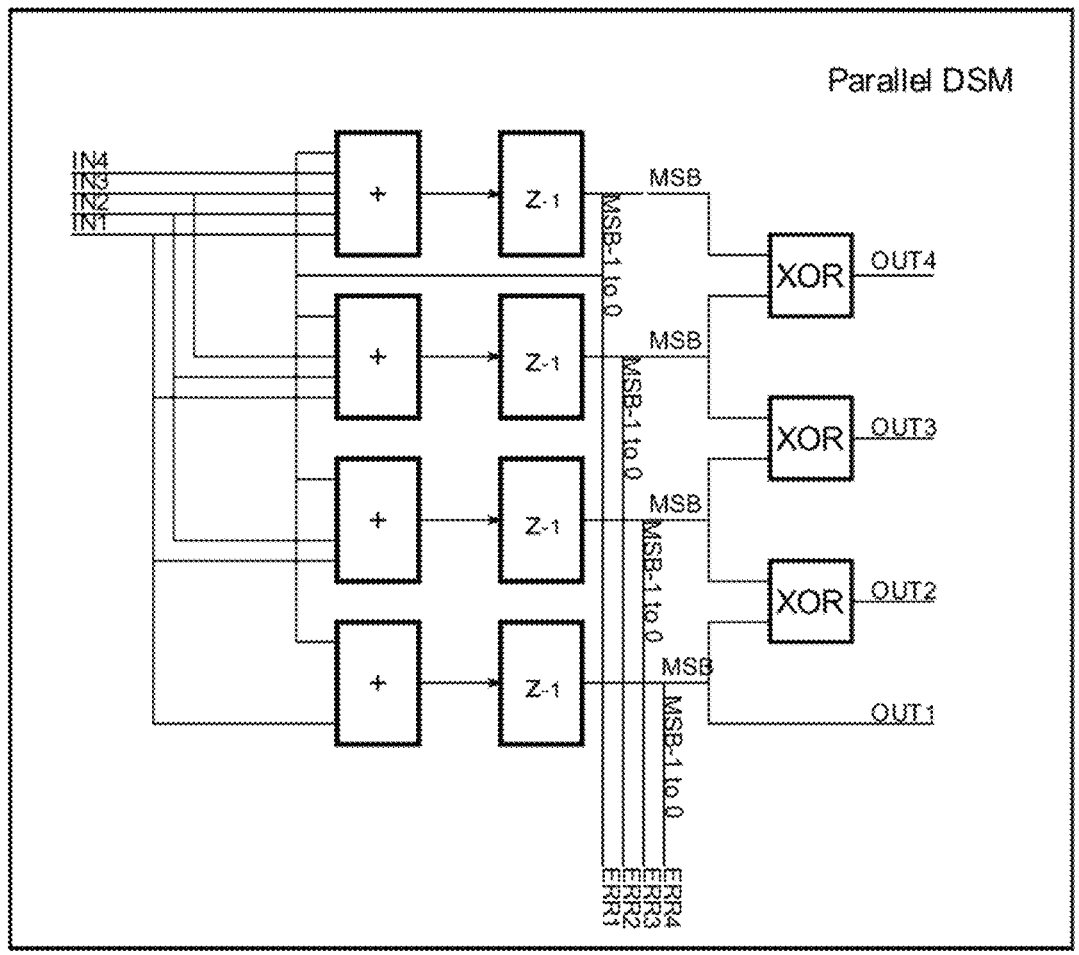
FIG. 9 shows an implementation of a first order MASH sigma delta modulator which can be used in a communication system in accordance with embodiments of the present invention.

FIG. 9 shows an implementation of 1st order MASH Sigma delta modulator.

Figure 10:
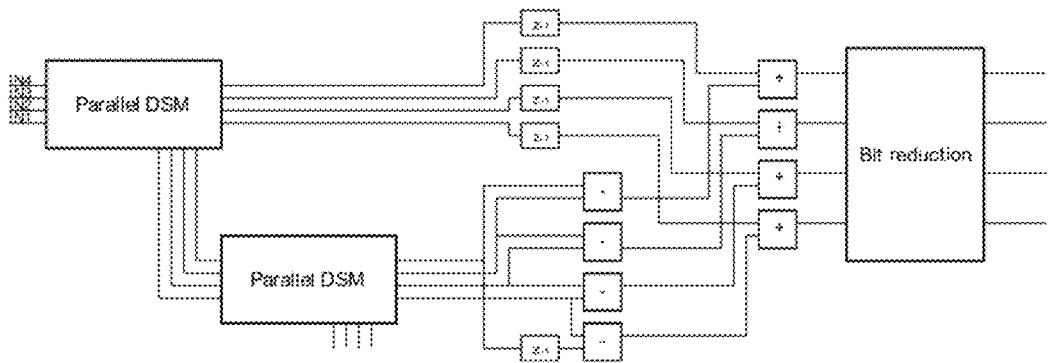
FIG. 10 shows a second order parallel MASH sigma delta modulator with bit reduction step which can be used in a communication system in accordance with embodiments of the present invention.

FIG. 10 shows a possible implementation of a second order MASH sigma-delta modulator with bit reduction. The second order implementation consists of two 1st order implementations of which a possible implementation is shown in FIG. 9. The first order modulators are combined with a combining structure (everything between parallel DSMs and Bit reduction). This results in a 2-bit signals which are converted back to a one-bit stream using a Bit reduction block.

A possible implementation of the bit reduction detects 2 different patterns and replaces them sequentially. The first pattern type consists of [−1 2 x] which will be replaced by [0 0 x+1] or [2−1 x] which will be replaced by [1 1 x−1]. The second kind of patterns consists of [−1 1 (n time 0) 1 0] which will be replaced by [0 0 (n times 0) 0 1] or [−1 1 (n time 0) 1−1] which will be replaced by [0 0 (n times 0) 0 0] or [2 0 (n time 1) 0 1] which will be replaced by [1 1 (n times 1) 1 0] or [2 0 (n time 1) 0 2] which will be replaced by [1 1 (n times 1) 1 1] with n starting from 0 or [−1 1] replaced with [0 0] or [−2 0] replaced with [1 1].

A second implementation of the bit reduction detects if a −1 or 2 occurs in the bitstream and corrects this value and adds [1 −2 1] or [−1 2 −1] to this value and the 2 consecutive values respectively. This is done sequentially for all occurring values.

Figure 11:
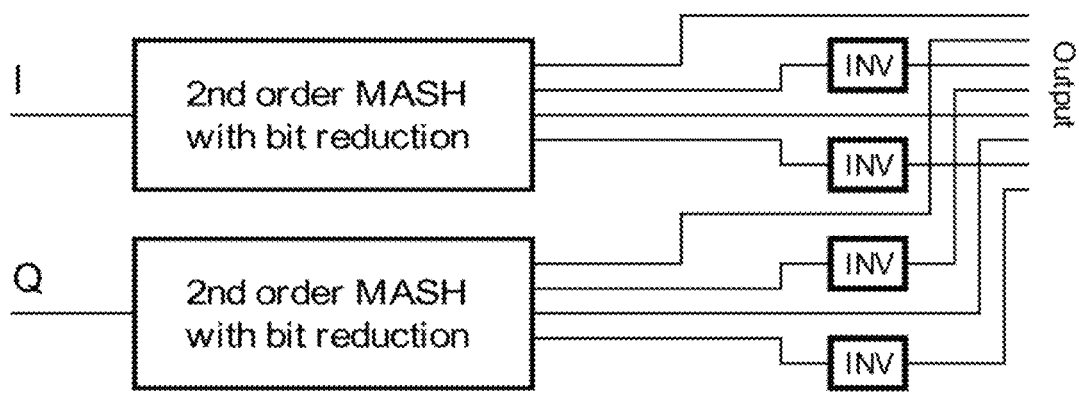
FIG. 11 shows a bandpass sigma delta modulator by combing two second order modulators which can be used in a communication system in accordance with embodiments of the present invention.

FIG. 11 shows a possible implementation to up-convert two baseband sigma-delta streams to a bandpass sigma delta stream. A first sigma-delta modulator modulates an in-phase signal (I), a second modulator modulates a quadrature signal (Q). The outputs are combined by interleaving the I and Q stream and inverting all even output samples of both modulators.

In a second aspect embodiments of the present invention relate to a mobile network. Such a mobile network comprises a communication system 100 in accordance with embodiments of the present invention. The communication system is used to transmit data between a base station of the mobile network and an antenna of the mobile network. Such a mobile network may for example be a 5G network.

In a third aspect embodiments of the present invention relate to a method for transmitting a RF signal which has a frequency band.

The method comprises a modulation step wherein the RF signal is oversampled and sigma delta modulated into a broadband signal wherein the signal to noise ratio of the broadband signal is higher in the frequency band of the RF signal than outside the frequency band of the RF signal.

The method moreover comprises an electro-optical conversion step wherein the broadband signal is converted into an optical signal and transmitted over an optical link.

The method moreover comprises an opto-electrical conversion step wherein the broadband signal is received from the optical link and converted into an electrical signal, and a matching step for power matching and/or noise matching the electrical signal, at the frequency band of the RF signal, with an output device.

The invention claimed is:

1. A communication system for transmitting an RF signal which has a frequency band, the communication system comprising:
    a sigma delta modulator for modulating the RF signal into a broadband signal wherein the signal to noise ratio of the broadband signal is higher in the frequency band of the RF signal than outside the frequency band of the RF signal,
    an optical transmitter connected with the sigma delta modulator and with an optical fiber for transmitting the broadband signal over the optical fiber,
    a photo-detector configured for receiving the broadband signal from the optical fiber and converting it into an electrical signal,
    an output device and a matching circuit configured for power matching and/or noise matching of the photo-detector, at the frequency band of the RF signal, with the output device, such that out of band-noise, outside the frequency band of the RF signal, can be removed using the matching circuit.

2. A communication system according to claim 1, wherein the optical transmitter is a vertical-cavity surface-emitting laser.

3. A communication system according to claim 1, the output device comprising an antenna for transmitting the electrical signal.

4. A communication system according to claim 3, the output device moreover comprising an amplifier connected between the matching circuit and the antenna for amplifying the electrical signal before it is transmitted by the antenna wherein the matching circuit is configured for matching the photo-detector with the amplifier.

5. A communication system according to claim 1, wherein the sigma delta modulator is a bandpass modulator.

6. A communication system according to claim 1, wherein the sigma delta modulator is implemented as a parallel multi-stage noise shaping (MASH) modulator.

7. A communication system according to claim 1, wherein the sigma delta modulator is implemented as a second order parallel multi-stage noise shaping (MASH) modulator with bit-reduction.

8. A communication system according to claim 1 wherein the sigma delta modulator is a baseband modulator followed by a digital upconvertor.

9. A mobile network, the mobile network comprising at least one basestation, a plurality of antennas, and a plurality of communication systems according to claim 1, wherein the communication systems are connected between the basestations and the antennas for transmitting RF signals between the basestations and the RF antennas.

10. A method for transmitting an RF signal which has a frequency band, the method comprising:

a modulation step wherein the RF signal is oversampled and sigma delta modulated into a broadband signal wherein the signal to noise ratio of the broadband signal is higher in the frequency band of the RF signal than outside the frequency band of the RF signal, an electro-optical conversion step wherein the broadband signal is converted into an optical signal and transmitted over an optical link, an opto-electrical conversion step wherein the broadband signal is received from the optical link and converted into an electrical signal, a matching step for power matching and/or noise matching the electrical signal, at the frequency band of the RF signal, with an output device, such that out of band-noise, outside the frequency band of the RF signal, is removed by the matching step.

\* \* \* \* \*